(12) United States Patent
Fan

(10) Patent No.: US 8,493,851 B2
(45) Date of Patent: Jul. 23, 2013

(54) METHOD AND SYSTEM FOR OFFLOADING TUNNEL PACKET PROCESSING IN CLOUD COMPUTING

(75) Inventor: Kan Frankie Fan, Irvine, CA (US)

(73) Assignee: Broadcom Corporation

( * ) Notice: Subject to any disclaimer, the term of this patent is extended or adjusted under 35 U.S.C. 154(b) by 176 days.

(21) Appl. No.: 13/010,376

(22) Filed: Jan. 20, 2011

(65) Prior Publication Data
US 2011/0274108 A1 Nov. 10, 2011

Related U.S. Application Data

(60) Provisional application No. 61/332,530, filed on May 7, 2010.

(51) Int. Cl.
*G01R 31/08* (2006.01)
(52) U.S. Cl.
USPC .......................... 370/230; 370/392; 370/401
(58) Field of Classification Search
USPC .............................. 370/230, 392, 395.53, 401
See application file for complete search history.

(56) References Cited

U.S. PATENT DOCUMENTS

| | | |
|---|---|---|
| 6,950,862 B1 | 9/2005 | Puthiyandyil et al. |
| 2004/0100953 A1 | 5/2004 | Chen et al. |
| 2006/0248581 A1 | 11/2006 | Sundarrajan et al. |
| 2007/0271453 A1 | 11/2007 | Pohja et al. |
| 2009/0041038 A1 * | 2/2009 | Martini et al. ............... 370/401 |
| 2010/0157963 A1 * | 6/2010 | Choi et al. ................... 370/338 |
| 2011/0075557 A1 * | 3/2011 | Chowdhury et al. ......... 370/230 |

OTHER PUBLICATIONS

EPO Communication dated Aug. 2, 2011 in Application 11003660.5-2416 (6 pages).

* cited by examiner

*Primary Examiner* — Jung Park
(74) *Attorney, Agent, or Firm* — Brinks Hofer Gilson & Lione

(57) ABSTRACT

A network device may provide Layer-2 (L2) based tunneling to offload at least a portion of tunneling performed by tunneling gateways. The L2 based tunneling provided by the network device may comprise determining one or more other network devices that may receive traffic packets which may be handled by the tunneling gateways; and communicating at least a portion of the traffic packets to the one or more other network devices directly from the network device, using L2 tunnels established via the network device such that communication of the at least a portion of the one or more traffic packets offloads tunneling by bypassing the one or more tunneling gateways. At least a portion of the L2 based tunnel offloading by the network device may be handled via a network controller. Providing the offloaded tunneling in the network device may be based on determined of traffic type of the traffic packets.

20 Claims, 7 Drawing Sheets

METHOD AND SYSTEM FOR OFFLOADING TUNNEL PACKET PROCESSING IN CLOUD COMPUTING

CROSS-REFERENCE TO RELATED APPLICATIONS/INCORPORATION BY REFERENCE

This patent application makes reference to, claims priority to and claims benefit from U.S. Provisional Application Ser. No. 61/332,530 filed on May 7, 2010.

The above stated application is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to networking. More specifically, certain embodiments of the invention relate to a method and system for offloading tunnel packet processing in cloud computing.

BACKGROUND OF THE INVENTION

"Cloud" computing, or Internet-based computing, provides many attractive features to enterprise networks. Cloud computing often enables use of applications without installing the applications on a particular end-system. That is, the servers and applications reside in the "cloud." As a result, applications and data may be available from virtually anywhere. However, with existing technology, the complexities and costs associated with a shift from a client-server based enterprise network a cloud based network may be prohibitive for many enterprises.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for offloading tunnel packet processing in cloud computing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for offloading tunnel packet processing in cloud computing. In various embodiments of the invention, a network device may provide Layer-2 (L2) based tunneling, which may be used to offload at least a portion of tunneling operations and/or services provided by tunneling gateways. The L2 based tunnel processing provided in the network device may comprise determining one or more other network devices to which traffic packets handled in the network device may be destined. At least a portion of the traffic packets may be communicated to the one or more other network devices from the network device, such that communication of the at least a portion of the traffic packets offloads tunneling by bypassing the one or more tunneling gateways. In this regard, the at least portion of the traffic packets may be communicated via one or more L2 tunnels which may be established via the network device for tunneling offloading. The at least portion of traffic packets communicated via the L2 tunnels may be formatted for communication via the L2 tunnels established via said network device, by encapsulating them into IP packets for example. At least a portion of the L2 based tunneling provided by the network device may be handled by a network controller in the network device. In this regard, the L2 based tunnel processing handled by the network controller may be performed transparently in the network device. The tunneling offloading performed in the network device may be based on determination of traffic type of the handled traffic packets. The traffic packets may comprise, for example, unicast, multicast, and/or broadcast traffic. In this regard, only unicast traffic packets may be handled during the offloaded L2 tunnel processing in the network device. Multicast or broadcast traffic may be forwarded to the tunneling gateways for handling therein. The network device may maintain a tunneling table for use during the L2 based tunnel processing in the network device.

Figure 1A:
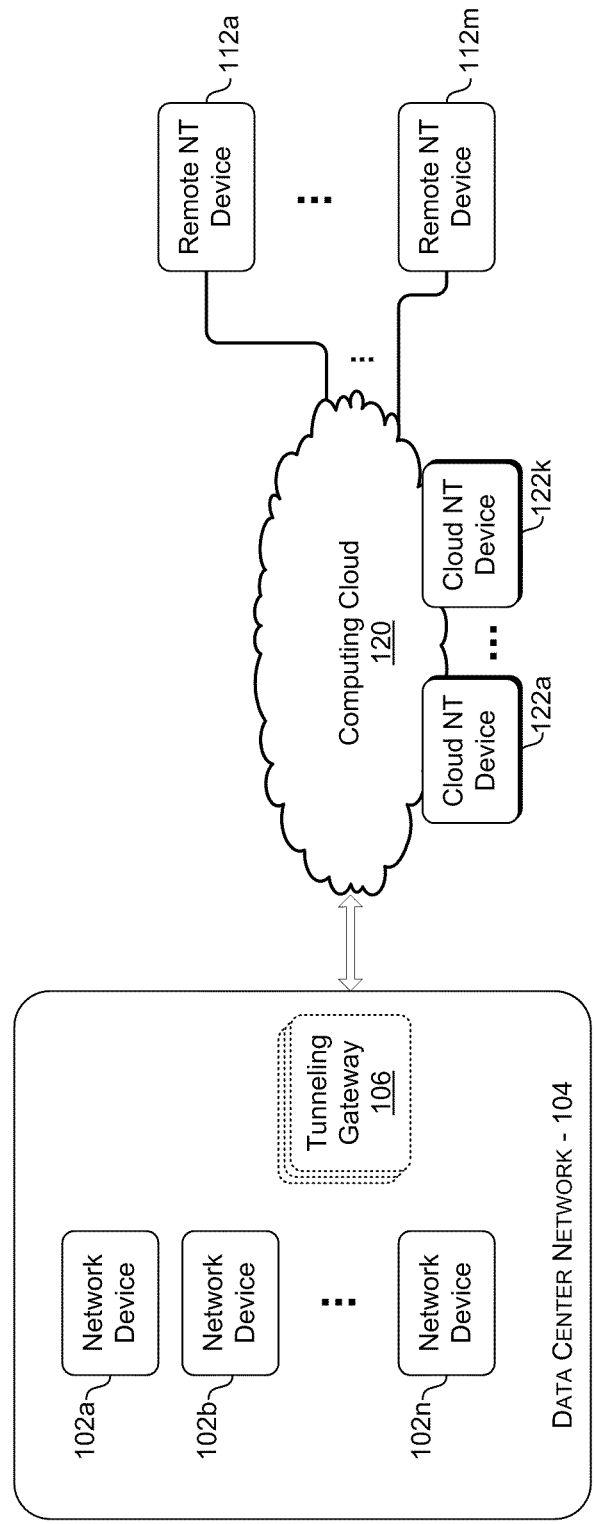
FIG. 1A is a block diagram illustrating an exemplary communication system that may support tunneling, and comprising a datacenter that services a plurality of local network devices, which may be utilized in accordance with an embodiment of the invention.

FIG. 1A is a block diagram illustrating an exemplary communication system that may support tunneling, and comprising a datacenter that services a plurality of local network devices, which may be utilized in accordance with an embodiment of the invention. Referring to FIG. 1A, there is shown a datacenter network 104, a plurality of local network devices 102a-102n, one or more tunneling gateways 106, a plurality of remote network device 112a-112m, a computing cloud 120, and a plurality of cloud network devices 122a-122k.

Each of the local network devices 102a-102n may comprise suitable logic, circuitry, interfaces, and/or code that may be operable to perform various tasks and/or execute applications based on, for example, preloaded instructions and/or user input or feedback (e.g. in response to device output). Exemplary network devices may comprise desktop personal computers (PC), laptops, smartphones or other handheld mobile devices, servers, switches, and/or routers. Each of the local network devices 102a-102n may communicate data and/or messages during performance of tasks and/or execution of applications. In this regard, the local network devices 102a-102n may transmit and/or receive data VIA wireless and/or wired network links. The network links used by local network devices 102a-102n may comprise Ethernet links, such as 10/100 Mbps Ethernet, 1 Gigabit Ethernet, or 10 Gigabit Ethernet (10 GbE) links; cellular links; wireless local area network (WLAN) links, such as WiFi (IEEE 802.11); and/or other similar wireless and/or wired links. The remote network device 112a-112m may be similar to the local network device 102-102n. The remote network devices 112a-112m may not necessarily be associated with the datacenter 104. Rather, the remote network devices 112a-112m may be associated with different datacenters and/or be unassociated with any datacenter.

The datacenter network 104 may correspond to a network serviced by a datacenter. In this regard, the datacenter network 104 may correspond to a private network managed by a particular information technology (IT) operator, which may utilize one or more datacenter facilities, housing IT equipment and/or providing related services to devices and/or users in the associated network. Datacenters may be utilized to house mainframe computing systems, and/or devices providing primary and/or secondary (e.g. backup or redundant) telecommunication and/or storage applications.

The tunneling gateway 106 may comprise suitable logic, circuitry, interfaces, and/or code that may be utilized to provide tunneling services and/or communications based thereon. In this regard, the tunneling gateways 106 may be operable to support one or more tunneling protocols that may be provide tunneling connections. In tunneling based communication, a particular protocol, which may be designated as a delivery protocol, may be utilized to encapsulate and/or carry data or packets corresponding to another protocol, which may be designated as a payload protocol. This may enable carrying data corresponding to the payload protocol over an incompatible delivery-network corresponding to the delivery protocol, to provide secure communication of that data through what may otherwise constitute untrusted network. Within the Open Systems Interconnection (OSI) model, the delivery protocol may typically operate at the same or at different level in the OSI model than the payload protocol. For example, in instances where the payload packets comprise Layer 2 (L2) packets, tunneling based delivery of the L2 packets may also based on another network protocol, such as the Internet Protocol (IP) for example. In this regard, the tunneled L2 packets may be encapsulated communicated within IP packets that may be communicated any IP capable network. Various tunneling protocols may be utilized to enable IP-based tunneling communications, including, for example, the Generic Routing Encapsulation (GRE) protocol. In this regard, payload IP packets comprising private addresses may be carried (tunnel) over the Internet using GRE based delivery packets with public IP addresses. During such tunneling operations, L2 MAC addresses may be utilized the primary identification means for traffic steering and routing.

The computing cloud 120 may comprise a plurality of interconnected devices, systems, and/or subnets, which may provide and/or support various services offered by the computing cloud 120. In this regard, the term 'cloud' may refer to the Internet, and is based on the graphical depiction of the Internet as a cloud in computer network diagrams to represent the underlying infrastructure of the Internet. The computing cloud 120 may comprise, for example, a plurality of servers and/or computing devices associated with providing various services offered by the computing cloud 120. In this regard, these servers may be utilized to provide reliable services that may be delivered through individual servers and/or datacenters, for example. The computing cloud 120 may appear, to a user for example, as a single point of access to services and/or resources that may be provided by the computing cloud 120. Servers in the computing cloud 120 may comprise, for example, applications servers that may be dedicated to running certain software applications and/or web servers to which HTTP clients may connect to send commands and receive responses along with data content. The computing cloud 120 may also comprise network devices, such as the network device 122a-122k, which while accessing the computing cloud 120 to obtain certain services, may themselves be utilized in supporting services provided by the computing cloud 120. In this regard, the network device 122a-122k may be similar to the remote network devices 112a-112m.

In operation, the tunneling gateway 106 may be utilized to provide tunneling services within network devices in the datacenter network 104. In this regard, tunneling based communications may be utilized during interactions between network devices within the datacenter network 104 and network devices outside it, such as one or more of the remote devices 112a-112m. In this regard, the tunneling gateways 106 may be operable to support one or more tunneling protocols that may be provide tunneling connections, between one or more of the local network devices 102a-102n and/or one or more corresponding peers outside the datacenter network 104, such as one or more of the remote devices 112a-112m. Concentrating tunneling operations to the tunneling gateways 106, however, may be undesirable since in heavy load situations, the tunneling gateways 106 may turn into networking bottlenecks. Accordingly, in various exemplary embodiments of the invention, at least of portion of tunneling operations may be offloaded from the tunneling gateways 106, into network devices that may be attempting to utilize tunneling based communications. For example, in instances where the tunneling communication are L2 based tunneling, comprising tunneling L2 packets using IP based packets, based on the GRE protocol for example, at least some of the L2 tunnel processing may be performed directly within the network devices 102a-102n. This may enable offloading at least some of the tunnel processing that may otherwise be performed within the tunneling gateways 106, such that processing load therein may be reduced and/or processing or storage resources may be freed.

Figure 1B:
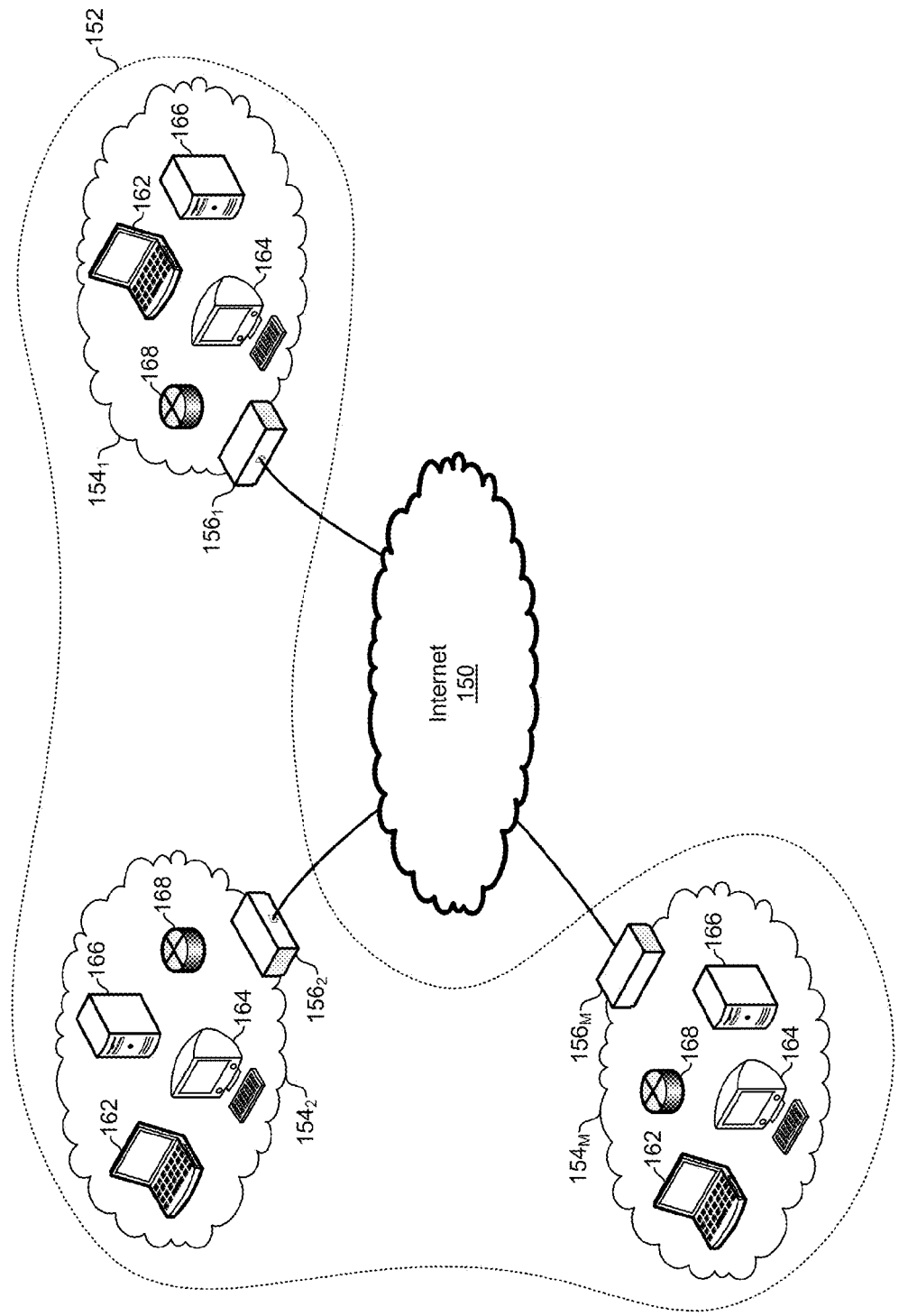
FIG. 1B is a diagram illustrating an exemplary distributed datacenter environment, which may be utilized in accordance with an embodiment of the invention

FIG. 1B is a diagram illustrating an exemplary distributed datacenter environment, which may be utilized in accordance with an embodiment of the invention. Referring to FIG. 1B there is shown a distributed datacenter environment 152 comprising a plurality of local datacenter networks $154_1\text{-}154_M$. Each of the local datacenter networks $154_1\text{-}154_M$ may be substantially similar to the datacenter network 104 of FIG. 1A. In this regard, each of the plurality of local datacenter networks $154_1\text{-}154_M$ may comprise a plurality of network devices, the latter of which may comprise, for example, one or more laptops 162, one or more desktops 164, one or more servers 166, and/or one or more switches 168.

In an exemplary aspect of the invention, each of the local datacenter networks $154_1$-$154_M$ may be serviced by one or more tunneling gateways, of which tunneling gateways $156_1$-$156_M$ are shown. In this regard, each of the tunneling gateways $156_1$-$156_M$ may be similar to the tunneling gateway 106, substantially as described with regard to FIG. 1A.

While traditional datacenters were originally limited and confined physically and/or geographically, recent advances in datacenter technologies ushered new era of mobility and redundancy. In this regard, current datacenters may span large geographical regions, and emphasize and/or support distributed environment comprising multiple locations with different systems therein, as shown in the distributed environment 152 of FIG. 1B. Furthermore, the emergence and/or development of virtualization technologies also added to the need for more mobility in datacenter based servicing. In this regard, platforms, such as servers 166, may be configured to support virtualized machines (VMs) running on top of hypervisors providing interactions with the platform and/or physical resources therein. In this regard, the VMs may be utilized for hosting applications which may run within the VMs independent of and/or transparent to the platforms and/or the physical resources underneath. Accordingly, the VMs, and/or any applications therein, may be amenable to transparent migration between physical machines, such as from server 166 in local datacenter network 156₁ to desktop 164 in local datacenter network 156₂. While it may be preferred that communication between components be limited to a trusted environment, components in distributed environments, such as distributed datacenter environment 152, may need to communicated using devices and/or networks, such as IP-based network like the Internet 150, which may not be members of the same trusted environment. Accordingly, secure communication may be ensured by use of additional measures that may protect security of the communication even while traversing untrusted networks and/or devices.

Tunneling may be utilized, for example, to provide secure communication in distributed environments, such as the distributed datacenter environment 152. In this regard, tunneling gateways, such as the tunneling gateways $156_1$-$156_M$, may be utilized to enable exchange of messages and/or data exchanged between components within a distributed environment, such as within the distributed datacenter environment 152, by encapsulating them in accordance with a tunneling protocol to protect them during traversal of untrusted entities. IP based tunneling protocols, such as GRE, may be utilized to tunnel packets by encapsulating them within IP packets, to take advantage of the prevalence of IP based networks for example. In this regard, the tunneled packets may be communicated as payloads of the IP packets, with additional headers, such as TCP and/or IP headers, being added to them for example. Accordingly, messages and/or data exchanged between components of the distributed datacenter environment 152 may be tunneled as Layer2 (L2) packets which are encapsulated within IP packets, such that they may be communicated via the Internet 150 for example. Furthermore, during such L2 based tunneling operations, L2 MAC addresses may be utilized as the primary identification means for traffic steering and routing. In this regard, the Unified Layer-2 network is one solution in which the Layer-2 broadcast domain concept may be extended beyond locally attached networks, such as each of the local datacenter network $156_1$-$156_M$. By using tunneling and packet encapsulation, a unified Layer-2 network may be established across multiple local datacenters networks. Use of the Unified Layer-2 broadcast domain may impose various requirements, however, such as delivery of unicast traffic to the correct end stations if location is known, or flooding the unicast traffic to a plurality of segments regardless of geographic locations; replication of multicast traffic to a plurality of segments; replication of broadcast traffic to a plurality of segments; and avoidance of network loop if there are multiple paths of interconnecting tunneling gateways, or if there are more than one tunneling gateways.

Concentrating all tunneling operations to the tunneling gateways tunneling gateways $156_1$-$156_M$, however, may be undesirable, especially in heavy load situations where the tunneling gateways $156_1$-$156_M$ may turn into networking bottlenecks. Accordingly, in various exemplary embodiments of the invention, at least of portion of tunneling operations may be offloaded from the tunneling gateways tunneling gateways $156_1$-$156_M$, into network devices within the distributed datacenter environment 152 for example to reduce workload at the tunneling gateways $156_1$-$156_M$, and/or to free resources therein. In this regard, the offloading may be performed in selective manner, to ensure continued validity and/or security of communication. For example, in instances where a unified Layer-2 broadcast network is configured, within the distributed datacenter environment 152, for tunneling purposes, the offloading may be limited to specific type of traffic, such as unicast traffic, and/or only under certain conditions. In this regard, correct delivery of unicast traffic may typically require distributing locality and/or addressing information to all the local datacenter networks $154_1$-$154_M$. In this regard, locality information associated with a device may comprise information pertaining to and/or describing or defining the location of the associated device. The locality information may comprise, for example, physical location related information, such as geographical related information. The locality information may also comprise logical related location information, such as information describing position of the associated device logically within a network and/or distributed environment hierarchy, which may enable determining nearest tunneling gateway in the distributed datacenter environment 152 for example. Accordingly, the locality and/or addressing information may be utilized to ensure proper routing of traffic packet, such that when unicast traffic is received by a tunneling gateway, such as the tunneling gateway 156₁ for example, it may be encapsulated and delivered to the correct corresponding tunneling gateway(s) and subsequently to the correct endpoint network device(s). In the case where the locality and/or addressing information may not be present, the encapsulated traffic would be delivered to all of the tunneling gateways $156_1$-$156_M$.

Accordingly, to offload unicast traffic tunneling, network devices may perform lookup of locality and/or addressing information, and encapsulation/decapsulation when possible, such as based on availability of locality and/or addressing information instead of relying on and/or utilizing tunneling gateways, which ultimately enhance overall scalability and stability in the distributed datacenter environment 152. Tunneling multicast and/or broadcast traffic may remain in the tunneling gateways $156_1$-$156_M$, however. In this regard, replication of multicast and/or broadcast are essential responsibilities of tunneling gateways where received traffic at gateways are encapsulated and unicast to other tunneling gateways in the same Layer-2 broadcast domain. Upon arriving at the destination tunneling gateways, encapsulated traffic would be recovered into multicast or broadcast Layer-2 packets, which would then be submitted to the local networks and eventually be replicated to all the segments. Furthermore, all types of traffic, included offloaded traffic, may also require special handling in tunneling gateways such that the traffic would not be resubmitted to an originator local datacenter network or to which the traffic previously was delivered, which would otherwise cause network loops. Network devices serviced by offloaded tunneling data flow may comprise devices with non-virtualization based architecture, where a single operating system may be running; devices with virtualization based architecture, comprising plurality of a virtual machines (VMs), Single Root I/O Virtualization (SR-IOV), and/or Multi-Root I/O Virtualization (MR-IOV); and/or any combinations thereof.

Figure 2:
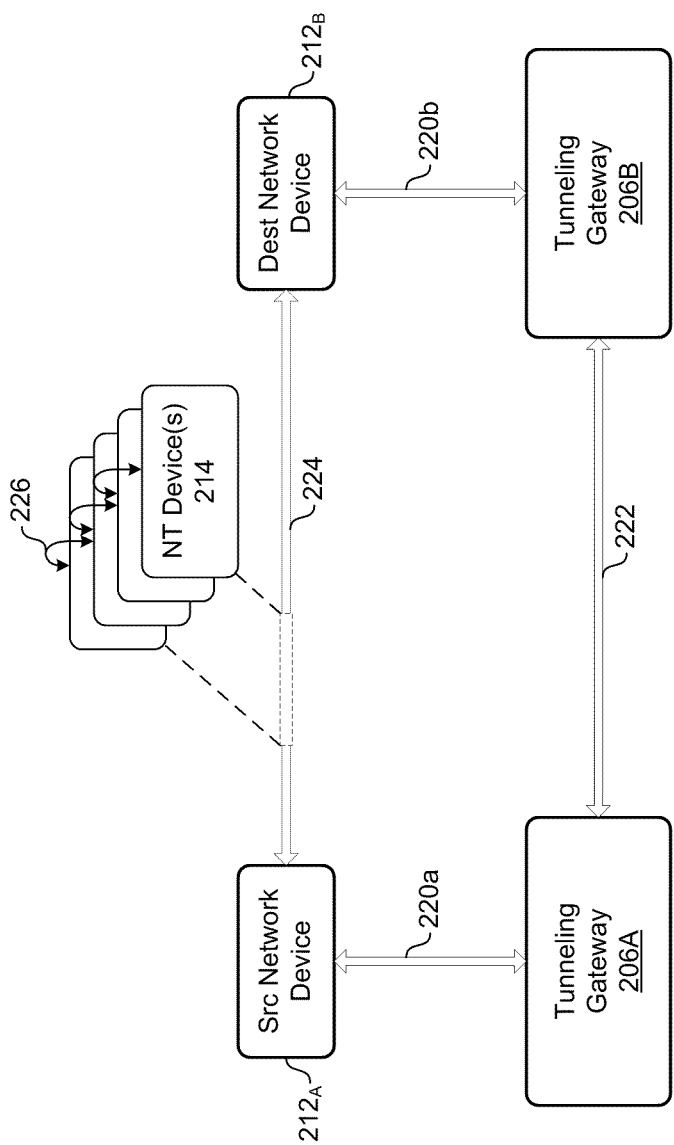
FIG. 2 is a block diagram illustrating an exemplary communication system utilizing offloaded tunneling, in accordance with an embodiment of the invention.

FIG. 2 is a block diagram illustrating an exemplary communication system utilizing offloaded tunneling, in accordance with an embodiment of the invention. Referring to FIG. 2, there is shown network devices 212a and 212b, comprises source and destination network devices, and tunneling gateways 206a and 206b. Also shown in FIG. 2 are one or more network devices 214.

The tunneling gateways 206a and 206b may be similar to the tunneling gateway 106, substantially as described with regard to FIG. 1A. The network devices 212a and 212b may comprise network devices that may communicate via tunnel pipes. In this regard, the network devices 212a and 212b may correspond to network devices in different local datacenter networks $154_1$ - $154_m$ of the environment 152 of FIG. 1A. For example, the network device 212a may correspond to server 166 in the local datacenter network $156_1$, and the network device 212b may correspond to desktop 164 in the local datacenter network $156_2$.

In operation, the network devices 212a and 212b may communicate securely using the tunneling gateways 206a and 206b, respectively. In this regard, the network device 212a may communicate packets destined for the network device 212b to the tunneling gateway 206a associated with the network device 212a, via private connection 220a. The tunneling gateway 206a may strip the packet received from the network device 212a into L 2 packets by removing any additional headers for example. The stripped L 2 packets may then be encapsulated into IP-packets that may be communicated to the corresponding tunneling gateway 206b, via IP public connection 222, wherein the original L 2 packets may be communicated as payloads in the IP packets. The tunneling gateway 206b may de-capsulate the received IP packets, and may extract the original L 2 packets, which may then be forwarded to the network device 212b, via the private connection 220b.

To offload some of the tunneling servicing provided by the tunneling gateways 206a and 206b, at least some of the tunneled packets may be handled directly by the network devices. For example, the network devices 212a and 212b may be operable to handle certain types of traffic, such as unicast traffic directly via their own public and/or external connectivity, as shown by the IP public connection 224, which may traverse one or more external network devices 214 for example. In this regard, the network device 212a may perform lookup of locality and/or addressing information, and upon determination of availability of pertinent information corresponding to the network device 212b, may perform tunneling based encapsulation directly, to encapsulate the tunneled L 2 packets as IP packets, which may be communicated to the network device 212b via the IP connection 224. Similarly, the network device 212b may perform lookup of locality and/or addressing information, and upon based on availability of information corresponding to the network device 212a, may perform tunneling based de-encapsulation on received IP packets carrying the tunneled L 2 packets, which may be received via the IP connection 224.

Figure 3A:
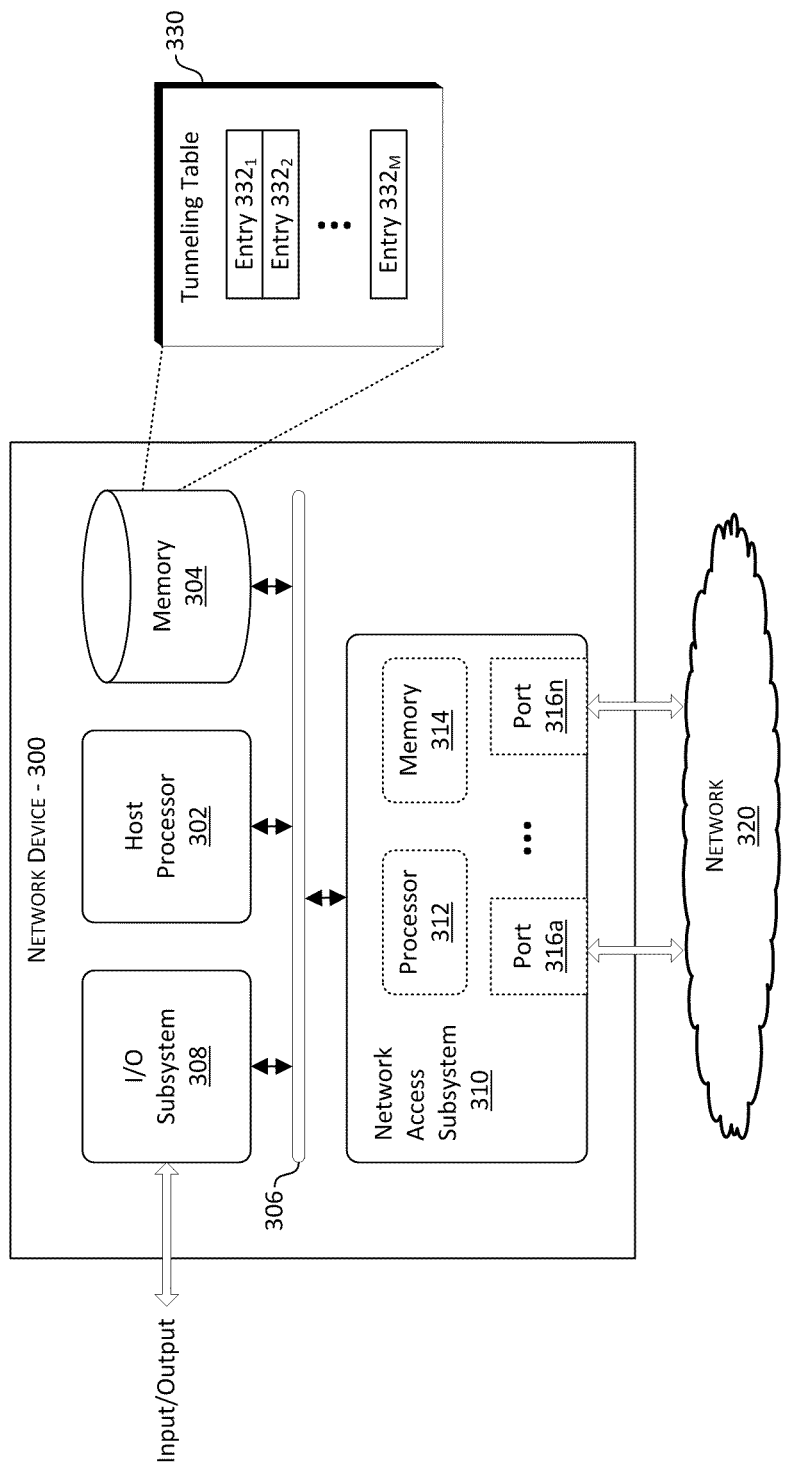
FIG. 3A is a block diagram illustrating an exemplary network device that may be configured to offload Layer 2 (L2) tunneling, in accordance with an embodiment of the invention.

FIG. 3A is a block diagram illustrating an exemplary network device that may be configured to offload Layer 2 (L2) tunneling, in accordance with an embodiment of the invention. Referring to FIG. 3A, there is shown a network device 300, a host processor 302, a system memory 304, a system bus 306, an input/output (I/O) subsystem 308, and a network access subsystem 310. Also shown in FIG. 3A is a network 320.

The network device 300 may comprise the host processor 302, the system memory 304, the system bus 306, the I/O subsystem 308, and/or the network access subsystem 310. In this regard, the host processor 302 may provide overall control and/or management of the operations of the network device 300; the I/O subsystem 308 may enable user interactions with the network device 300; and the network access subsystem 310 may enable communication of data and/or messages from and/or to the network device 300, when executing various tasks and/or applications. The network device 300 may also comprise other hardware resources (not shown) such as internal or peripheral sound and/or graphics cards, for example. The network device 300 may correspond to the network devices 212a, 212b, and/or 214 of FIG. 2 for example. In an exemplary aspect of the invention, the network device 300 may be operable to handle tunneling offloading from tunneling gateways, substantially as described with regard to, for example, FIGS. 1A, 1B, and/or 2. In this regard, the network device 300 may be operable to perform L 2 tunneling to enable forwarding L 2 packets, which may otherwise by tunneled via tunneling gateway, directly to destination network devices.

The host processor 302 may comprise suitable logic, circuitry, interfaces and/or code that may be operable to process data, and/or control and/or manage operations of the network device 300, and/or tasks and/or applications performed therein. In this regard, the host processor 302 may be operable to configure and/or control operations of various components and/or subsystems of the network device 300, by utilizing, for example, one or more control signals. The host processor 302 may also control data transfers within the network device 300. The host processor 302 may enable execution of applications, programs and/or code, which may be stored in the system memory 304 for example. The system memory 304 may comprise suitable logic, circuitry, interfaces and/or code that enable permanent and/or non-permanent storage and/or fetching of data, code and/or other information in the network device 300. In this regard, the system memory 304 may comprise one or more memory devices and/or may implement incorporate one or more memory technologies, including, for example, read-only memory (ROM), random access memory (RAM), and/or Flash memory. The system memory 304 may store, for example, configuration data, which may comprise parameters and/or code, comprising software and/or firmware, but the configuration data need not be limited in this regard.

The system bus 306 may comprise suitable logic, circuitry, interfaces, and/or code that may enable exchange of data and/or messages between various components and/or systems in the network device 300. In this regard, the system bus may comprise parallel or serial, and/or internal or external based bus technologies, and/or any combinations thereof. Exemplary system bus interfaces may comprise Inter-Integrated Circuit ($I^2C$), Universal Serial Bus (USB), Advanced Technology Attachment (ATA), Small Computer System Interface (SCSI), Peripheral Component Interconnect (PCI), and/or Peripheral Component Interconnect Express (PCI-e) based interfaces.

The I/O subsystem 308 may comprise suitable logic, circuitry, interfaces, and/or code that may enable inputting and/or outputting data and/or messages, to support user interactions with the network device 300 for example, to enable receiving user input and/or providing user output. For example, the I/O subsystem 308 may facilitate interactions with the network device 300 via one or more I/O devices, such as a monitor, a mouse, and/or keyboard.

The network access subsystem 310 may comprise suitable logic, circuitry, interfaces, and/or code that may be operable to communicate data and/or messages from and/or to the network device 300. The network access subsystem 310 may correspond to, for example, one or more network interface controllers (NICs) incorporated into the network device 300 to facilitate network accessibility. The network access subsystem 310 may comprise, for example, a networking processor 312, a networking memory 314, and/or a plurality of ports 316a-316n. The networking processor 312 may comprise suitable logic, circuitry, interfaces, and/or code for controlling and/or managing operations of the network access subsystem 310. The networking memory 314 may comprise suitable logic, circuitry, interfaces and/or code for dedicated local storage and/or buffering of data within the network access subsystem 310. In this regard, the networking memory 314 may comprise one or more ROM and/or RAM memory devices integrated into the network access subsystem 310. Each of the plurality of ports 316a-316n may comprise suitable logic, circuitry, interfaces, and/or code for providing network interfacing functionality, in the network access subsystem 310, based on one or more wired and/or wireless networking standards or protocols. The plurality of ports 316a-316n may comprise, for example, 10 GbE ports. The network access subsystem 310 may support and/or perform, for example, physical (PHY) layer related access, via the plurality of ports 316a-316n, and/or processing therefor. The network access subsystem 310 may also perform at least some Layer 2 (L2) processing. In this regard, the network access subsystem 310 may provide various Media Access Control (MAC) and/or Logical Link Control (LLC) related services. In an exemplary aspect of the invention, the network access subsystem 310 may be operable to perform and/or handle at least a portion of the tunneling offloading provided by the network device 300. In this regard, the network access subsystem 310 may be operable to the connections over which L2 tunnels, which may be utilized during the tunneling offloading, may be established. Furthermore, the network access subsystem 310 may provide at least some the formatting and/or packet handling required during tunneling offloading, via the networking processor 312 for example.

The network 320 may comprise a system of interconnected networks and/or devices which may enable exchange of data and/or messages among a plurality of nodes, based on one or more networking standards, including, for example, Internet Protocols (IP). The network 320 may comprise a plurality of broadband capable subnetworks, which may comprise, for example, satellite networks, cable networks, DVB networks, the Internet, and/or other local or wide area network. These subnetworks may collectively enable conveying data, via Ethernet packets for example, to plurality of end users. In this regard, physical connectivity within, and/or to or from the network 320, may be provided via copper wires, fiber-optic cables, wireless interfaces, and/or other standards-based interfaces. The network 320 may correspond to the computing cloud 120 of FIG. 1A and/or the Internet 150 of FIG. 1B.

In operation, the network device 300 may be utilized to execute various tasks, applications, and/or processes, via the host processor 302 for example. The tasks, applications, and/or processes executed by the network device 300 may be performed based on preprogrammed instructions, in the system memory 304 for example, and/or may be triggered and/or controlled by, and/or may require user input and/or output, which may be received and/or provided via the I/O subsystem 308, for example. During its operations, the network device 300 may transmit and/or receive data and/or messages, via the network access subsystem 310, for example. Data and/or messages communicated by the network device 300 may be transmitted and/or received, for example, via network links, which may be utilized through one or more of plurality of ports 316a-316n.

The network device 300 may be configured as a virtual platform. In this regard, the host processor 302 may be utilized, for example, to run a plurality of virtual machines (VMs). Furthermore, a hypervisor (HV) may be run and/or used, via the host processor 302 for example, to support operations of the VMs. In this regard, the hypervisor may be used to enable at least some of the VMs to interact with some of the physical resources in the network device 300, such as the network access subsystem 310.

In various embodiments of the invention, the network device 300 may support offloading tunnel processing from tunneling gateways, substantially as described with regard to, for example, FIGS. 1A, 1B, and 2. In this regard, the network device 300 may be operable to perform at least some of the tunnel processing that may otherwise be performed by a tunneling gateway, from which the tunnel processing may be offloaded. For example, in instances tunneling is performed within a unified Layer-2 broadcast network, the network device 300 may be utilized to handle tunneling at least a portion of the traffic, comprising unicast traffic for example, thus enabling offloading tunnel processing from tunneling gateways that are utilized to support the unified Layer-2 broadcast network. In this regard, the offloaded tunneling may be performed by the network access subsystem 310 for example. Utilizing the network access subsystem 310 may be advantageous because it may enable utilizing networking related processing and/or storage resources in the network access system 310. Furthermore, handling the tunneling within the network access system 310 may also allow performing that tunnel processing transparently to a host running in the network device 300, which may comprise an operating system or a virtual machine running therein.

In an exemplary aspect of the invention, the network device 300 may maintain, via the system memory 304 for example, a tunneling table 330, which may be utilized to store information associated with providing offloaded tunneling communication via the network device 300. Information in the tunneling table 330 may be generated and/or updated based on operations of the network device 300, such as during tunnel processing for example, and/or based on information received from other devices and/or entities, such as tunneling gateways for example. The tunneling table 330 may comprise a plurality of table entries $332_1$-$332_M$. Each entry 332 may store information associated with a particular tunneling pipe. Exemplary tunneling information associated with each table entry 332 may comprise, for example, attributes of the corresponding tunnel, such as encapsulation frame format (e.g. L2 vs. IP), local MAC destination, remote datacenter identifier, IP addresses, and/or any additional information that may be utilized during encapsulation, to formulate an outer delivery header that may encapsulate the original payload packet for example. Entries in the tunneling table 330 may be indexed and/or access based on an identifier uniquely associated with a tunneling peer. For example, the MAC address of the destination network device may be utilized as index for storage and/or retrieval of tunneling information in the tunneling table 330. The tunneling table 330 may be generated and/or updated by the network device 300, using the host processor 302 for example, during establishment, configuration, use, and/or management of offloaded tunnels provided via the network device 300.

Offloading L2 tunnel processing to the network device 300 may comprise performing, via the network access subsystem 310 for example, various tasks and/or operations that may necessary to facilitate the L2 tunneling offloading. Exemplary tasks may comprise encapsulation during transmission of tunneled traffic packets, decapsulation during reception of tunneled traffic packets, and/or fragmentation avoidance. In this regard, during encapsulation, for every transmit packet, the destination MAC address may be utilized to as key to lookup corresponding entry 332 in the tunneling table 330. In instances where an entry hit is found, such as $332_1$ for example, the tunneling attributes that may be stored therein may be utilized to encapsulate the payload packet to enable tunneling that packet to the destination network device. In this regard, the attributes retrieved from the table entry $332_1$ may be utilized to formulate an outer, delivery header that encapsulates the original payload packet. The resultant packet may then be transmitted into the network 320. In this regard, outer encapsulation header may be configured such that the resultant packet may appear as normal IP packet, to the edge routers of the local datacenter network for example, and accordingly, it may be forwarded to destination network device a remote datacenter network. Therefore, the associated tunneling gateway, and/or functions therein, may need not to be utilized.

Decapsulation may be performed on encapsulated tunneling packets, which may be received, from the network 320 for example, by the network access subsystem 310 of the network device 300, such as when the network device 300 corresponds to a destination network device, for example the destination network device 212b for example, during tunneling communication. In this regard, the decapsulation may comprise stripping any outer header, which may be added during the tunneling offloading for example, from received packets. The stripped header may be stored, at least temporarily, for policy checks for example. The recovered packet may then be processed in the same way as if the packet were originated locally, from within the local datacenter network for example. Furthermore, additional security checks may be performed to ensure that certain tunnel attributes are matched and/or are valid. In instances where the network device 300 is utilized for forwarding tunneled offloaded packets between the source network device and the destination network device, such as when the network device 300 corresponds to network devices 214 for example, the network access subsystem 310 may need to handle tunnel headers and parse the attributes of the original packet header information therein. Doing so may require changes to the packet parsers, in case of the single pass packet parsing for example, and/or may require performing additional integrity computations, such as checksum, on at least some portions of the tunneled packet, such as the payload portion carried therein.

Fragmentation avoidance may be performed to guard against exceeding maximum permitted packets sizes during tunneling operations. This may pertain to ensuring that packets formatted for tunneling based communication may not exceed the maximum allowed packet size, as to the delivery protocol utilized for communicated tunneled packets for example. The may result from tunneling related addition, such as the addition of tunneling header(s) for example. In this regard, inserting tunnel headers may cause the resultant packet to exceed the traditional maximum packet length. Accordingly, to prevent any resultant fragmentation, the network access subsystem 310 may handle packets based on tunneling offload awareness, such that the maximum MTU may be reduced accordingly.

Figure 3B:
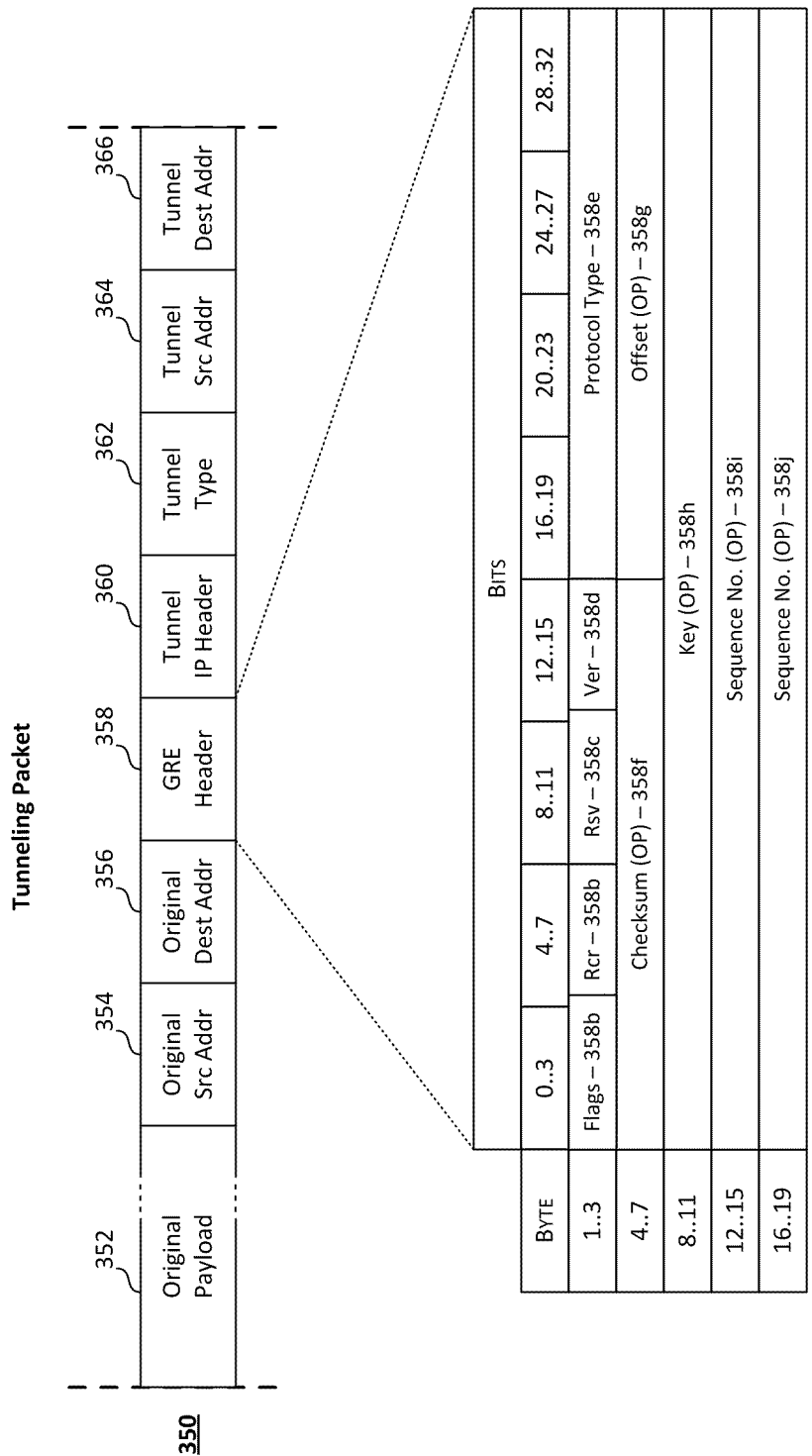
FIG. 3B is a block diagram that illustrates an exemplary tunneling packet that may be utilized in conjunction with offloaded Layer 2 (L2) tunneling based communications, in accordance with an embodiment of the invention.

FIG. 3B is a block diagram that illustrates an exemplary tunneling packet that may be utilized in conjunction with offloaded Layer 2 (L2) tunneling based communications, in accordance with an embodiment of the invention. Referring to FIG. 3B, there is shown there is shown a tunneling packet 350, which may be utilized during tunneling based communications, including during offloaded tunnel processing in network devices, such as the network device 300 for example.

The tunneling packet 350 may comprise a plurality of fields that may be set and/or used to enable communicated data via tunneling based pipe, between network devices for example. The tunneling packet 350 may be configured to support tunneling based on the Generic Routing Encapsulation (GRE) protocol for example. In this regard, the tunneling packet 350 may comprise, an original payload field 352, an original source address field 354, an original destination address field 356, a GRE header field 358, a tunnel Internet Protocol (IP) header field 360, a tunnel type field 362, a tunnel source address field 364, and a tunnel destination address field 366.

The original payload field 352 may correspond to the original data, as received from the originator, which is to be communicated via the tunneling based pipe. The original source address field 354 may be utilized to store addressing information, such as MAC address, of the original device, from which the data in the original payload field 352 originate. The original destination address field 356 may be utilized to store addressing information, such as MAC address, of the original destination device, to which the data in the original payload field 352 is destined.

The tunnel IP header field 360 may be utilized to store IP header related information associated with the tunneling communication, such as between each two consecutive nodes within the node. In this regard, in instances where the GRE protocol is selected and/or utilized for tunneling, this tunnel IP header field 360 may contain the IP source and IP destination addresses, path specific IP identifier (IPID), time-to-live (TTL) info. Furthermore, the protocol type sub-field may be set accordingly, such as to value 0x47.

The tunnel type field 362 may be utilized to store information associated with identifying the type of tunneling utilized. In this regard, the tunnel type field 262 may correspond to the outer Ethernet Type field in the encapsulated packet. In instances where the GRE protocol is selected and/or utilized for tunneling, wherein the encapsulation is GRE based, the tunnel type field 362 may be set accordingly to indicate that, such as to value 0x0800 for IP packets.

The tunnel source address field 364 may be utilized to store addressing information, such as MAC address, associated with source device for a specific tunnel link. In other words, the tunnel source address field 364 may contain the source MAC address of the encapsulated packet that is being communicated within a tunnel. The tunnel destination address field 366 may be utilized to store addressing information, such as MAC address, associated with destination device for a specific tunnel link. In other words, the tunnel destination address field 366 may contain the destination MAC address of the encapsulated packet that is being communicated within a tunnel. Values utilized in setting the IP header field 360, the tunnel type field 362, the tunnel source address field 364, and the tunnel destination address field 366 may be chosen such that the resultant packet 350 may appear as normal IP packet, to the edge routers of the local datacenter networks for example, and accordingly, it may be forwarded to destination network device a remote datacenter network.

The GRE header field 358 may comprise a plurality of fields that may be populated in accordance with the GRE protocol, to facilitate GRE based tunneling. In this regard, the GRE header field 358 may comprise, for example, a flags field 358a, a recursion field 358b, a reserved field 358c, a version information field 358d, a protocol type field 358e, a checksum field 358f, an offset field 358g, a key field 358h, a sequence number field 358i, and routing field 358j.

The flags field 358a may comprise a plurality of flag bits that may be set to indicate presence or validity of certain fields associated with GRE tunneling. The flags field 358a may comprise, for example, a 1-bit Checksum present flag, a 1-bit Routing present, a 1-bit Key present flag, a 1-bit Sequence Number present flag, and 1-bit Strict Source Route use flag. For example, when the 1-bit Checksum present flag is set, this indicates that the checksum field 358f is present and contains valid information. When the 1-bit Routing present flag is set, this indicates that offset field 358g is present and contains valid information. Furthermore, setting either of these two flags, the Checksum present flag and the 1-bit Routing present flag, may require that both fields must be present and valid. When the 1-bit Key present flag is set, this indicates that the key field 358h is present and contains valid information. When the 1-bit Sequence Number present flag is set, this indicates that the sequence number field 358i is present and contains valid information. The 1-bit Strict Source Route use flag may be set when the routing field 358j comprises Strict Source Routes.

The recursion field 358b may contain information pertaining to number of additional encapsulations that are permitted. In this regard, the default value may be "0." The version information field 358d may be utilized to store information associated with the GRE protocol version. Typically, the version information field is cleared (i.e. set to 0), exception in the case of Point-to-Point Tunneling Protocol (PPTP) where it is set to "1." The protocol type field 358e may contain information pertaining to protocol type of the payload packet. In general, the protocol type field 358e may be set based on the Ethernet protocol type field for the packet. The checksum field 358f may contain information pertaining to IP checksum of the GRE header 358 and the payload packet as a whole. The offset field 358g may be utilized to indicate the byte offset from the start of the routing field 358j to the first byte of the active Source Route Entry to be examined. The key field 358h may contain a number which was inserted by the encapsulator node. In this regard, the key field 358h is intended to be used for identifying an individual traffic flow within a tunnel. The sequence number field 358i may contain a number which was inserted by the encapsulator node. In this regard, the sequence number field 358i may be used at the receiver node to establish the order in which packets have been transmitted from the encapsulator node to the receiver node. The routing field 358j may contain a list of Source Route Entries (SREs).

Figure 4A:
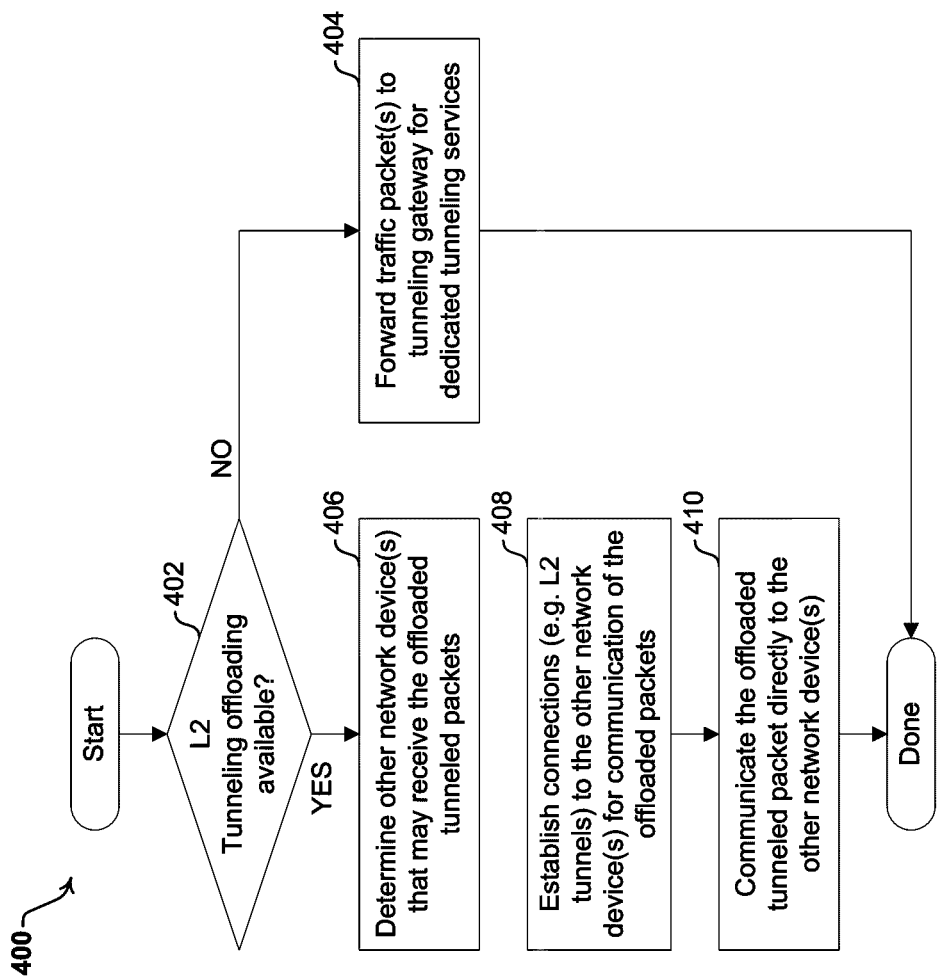
FIG. 4A is a flow chart that illustrates exemplary steps for offloading tunnel packet handling, in accordance with an embodiment of the invention.

FIG. 4A is a flow chart that illustrates exemplary steps for offloading tunnel packet handling, in accordance with an embodiment of the invention. Referring to FIG. 4A, there is shown a flow chart 400 comprising a plurality of exemplary steps that may be performed to enable offloading tunnel packet processing.

In step 402, a determination whether L 2 tunneling offloading in a network device may be performed. In this regard, it may be determined whether network device 300 may be operable to provide L 2 tunneling offloading, such as in a distributed datacenter environment for example. In instances where L 2 tunneling offloading is not available in the network device, the plurality of exemplary steps may proceed to step 404. In step 404, traffic packet(s) may be forwarded to tunneling gateway, for use of dedicated tunneling handling services therein. Returning to step 402, in instances where L 2 tunneling offloading is available in the network device, the plurality of exemplary steps may proceed to step 406. In step 406, one or more other network devices that may be operable to receive the offloaded tunneled traffic packets may be determined. In this regard, the one or more other network devices may comprise destination network devices and/or other network devices that may be traversed during the offloaded tunneling communication. In step 408, when necessary, connections may be established between the network device and the one or more other network devices, to enable communication of the offloaded tunneled traffic packets. In this regard, the connections may comprise L 2 tunnels established via the network device for example. In step 410, the offloaded tunneled packets may be communicated via the established connection to the one or more other network devices.

Figure 4B:
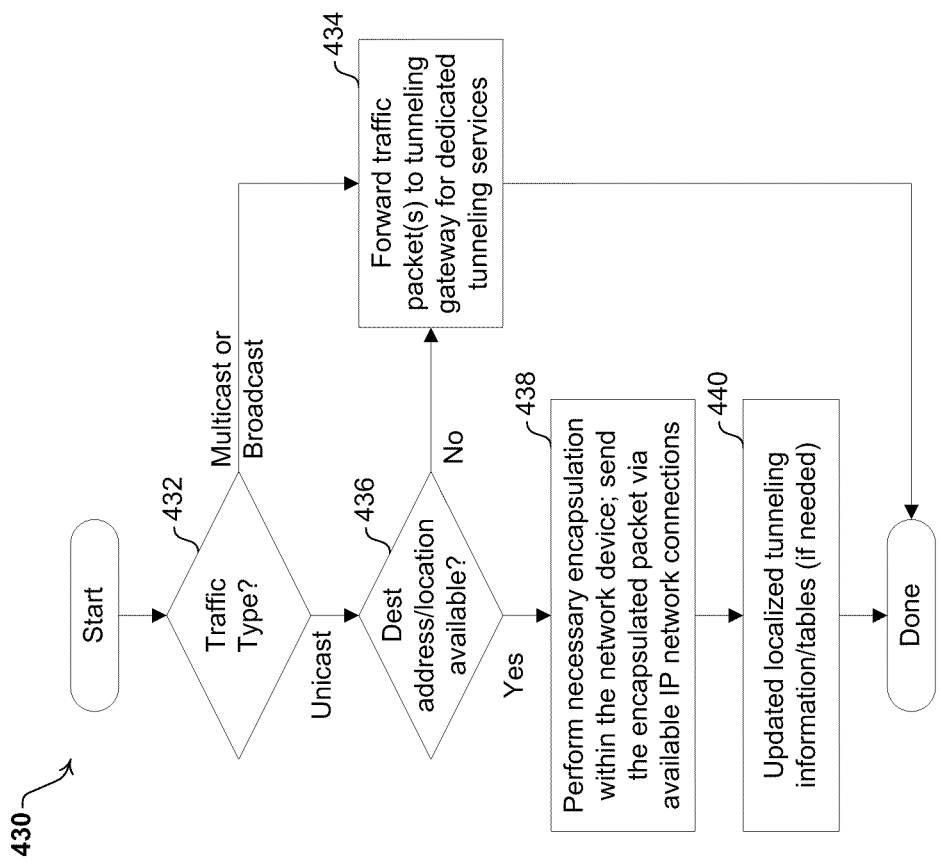
FIG. 4B is a flow chart that illustrates exemplary steps for offloading tunnel packet handling in cloud computing based on traffic type, in accordance with an embodiment of the invention.

FIG. 4B is a flow chart that illustrates exemplary steps for offloading tunnel packet handling in cloud computing based on traffic type, in accordance with an embodiment of the invention. Referring to FIG. 4B, there is shown a flow chart 430 comprising a plurality of exemplary steps that may be performed to enable offloading tunnel packet processing.

In step 432, traffic type may be determined. For example, in instances where tunneling comprises delivering L2 packets via IP packets, the traffic type determination maybe as to whether the tunneled L2 packets comprise unicast, multicast, and/or broadcast traffic based packets. In instances where the traffic type may be determined to be multicast or broadcast, the plurality of exemplary steps may proceed to step 404. In step 434, traffic packet(s) may be forwarded to tunneling gateway, for use of dedicated tunneling handling services therein.

Returning to step 432, in instances where the traffic type may be determined to be unicast, the plurality of exemplary steps may proceed to step 436. In step 436, a determination whether destination address/location are available may be performed. In instances where the destination information may not be available, the plurality of exemplary steps may proceed to step 434. In instances where the destination addressing and/or location information are available, the plurality of exemplary steps may proceed to step 438. In step 438, necessary encapsulation may be performed within the network device, and the resultant encapsulated packet(s) may be communicated directly by the network device, via available IP network connections therein. In step 440, localized tunneling information/tables, within the network device, may be updated and/or modified (if needed), based on handling of the tunneled packets for example.

Various embodiments of the invention may comprise a method and system for offloading tunnel packet processing in cloud computing. The network device 300 may provide Layer-2 (L2) based tunneling, which may be used to offload at least a portion of tunneling operations and/or services provided by tunneling gateways, such as one or ore of the tunneling gateways $156_1$-$156_M$, which may provide tunneling services to each of the local datacenter networks $154_1$-$154_M$, respectively, in the distributed datacenter environment 152. In this regard, the L2 based tunneling provided in the network device 300 may comprise determining one or more other network devices to which traffic packets handled in the network device 300 may be destined. At least a portion of the traffic packets may be communicated to the other network device from the network device 300, such that communication of the portion of traffic packets may enable offloading tunneling by bypassing at least some of the tunneling gateways 156$_1$-156$_M$, which may otherwise be utilized for tunneling the traffic packets. In this regard, the at least portion of the traffic packets may be communicated via one or more L2 tunnels which may be established via the network device 300, for tunneling offloading. The portion of traffic packets communicated via the L2 tunnels may be formatted for communication using the L2 tunnels established via said network device 300, by encapsulating them into IP packets for example.

At least a portion of the L2 based tunneling provided by the network device 300 may be handled by the network access subsystem 310 in the network device 300, which comprise a network interface controller (NIC) for example. In this regard, the L2 based tunneling related processing may be performed within the network access subsystem 310, via the networking processor 312 for example. Furthermore, the network access subsystem 310 may handle and/or perform L2 based tunneling operations transparent to other operations in the network device 300. The tunneling offloading performed in the network device 300 may be based on determination of traffic type of the handled traffic packets. The traffic packets may comprise, for example, unicast, multicast, and/or broadcast traffic. In this regard, only unicast traffic packets may be handled during the offloaded L2 tunnel processing in the network device 300. Multicast or broadcast traffic may be forwarded to the tunneling gateways 156$_1$-156$_M$, for dedicated handling therein. The network device 300 may maintain, via the network access subsystem 310, the tunneling table 330, which may be utilized during the L2 based tunnel processing in the network device 300.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for offloading tunnel packet processing in cloud computing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a network device:
selectively offloading tunneling handled by a tunneling gateway based on traffic type by:
determining a traffic type of a traffic packet; and
when the traffic type of the traffic packet comprises unicast traffic:
instead of forwarding the traffic packet to the tunneling gateway for tunneling of the traffic packet by the tunneling gateway, establishing a separate tunnel for communicating the traffic packet to a destination network device, where the separate tunnel bypasses the tunneling gateway; and
communicating the traffic packet to the destination network device through the separate tunnel that bypasses the tunneling gateway; and
when the traffic type of the traffic packet comprises multicast traffic:
forwarding the traffic packet to the tunneling gateway for tunneling of the traffic packet by the tunneling gateway.

2. The method according to claim 1, further comprising:
formatting the traffic packet for communicating via the separate tunnel that bypasses the tunneling gateway.

3. The method according to claim 1, comprising establishing the separate tunnel via a network connection available to the network device.

4. The method according to claim 1, further comprising maintaining a tunneling table for use during the offloading when the traffic type of the traffic packet comprises unicast traffic.

5. The method according to claim 1, further comprising;
forwarding the traffic packet to the tunneling gateway for tunneling of the traffic packet when the traffic type comprises broadcast traffic.

6. The method according to claim 1, where forwarding comprises:
forwarding the traffic packet to the tunneling gateway through a private network.

7. The method according to claim 1, further comprising:
receiving, through the separate tunnel that bypasses the tunneling gateway, an encapsulated traffic packet that was encapsulated by the destination network device; and
decapsulating the encapsulated traffic packet.

8. The method according to claim 1, further comprising, when the traffic type of the traffic packet comprises unicast traffic:
determining whether addressing information of the destination network device is available; and
when the addressing information of the destination network device is not available:
forwarding the traffic packet to the tunneling gateway for tunneling of the traffic packet by the tunneling gateway; and
when the addressing information of the destination network device is available:

encapsulating the traffic packet using the addressing information; and establishing the separate tunnel and communicating the traffic packet to the destination network device.

9. The method according to claim 8, where determining whether addressing information of the destination network device is available comprises:

performing a lookup in a tunneling table.

10. The method according to claim 8, where the network device that performs the selective offloading comprises an end-point network device.

11. A system, comprising:

a circuit in a network device, the circuit operable to:

selectively offload tunneling handled by a tunneling gateway based on traffic type by:

determining a traffic type of a traffic packet; and when the traffic type of the traffic packet comprises unicast traffic:

instead of forwarding the traffic packet to the tunneling gateway for tunneling of the traffic packet by the tunneling gateway, establishing a separate tunnel for communicating the traffic packet to a destination network device, where the separate tunnel bypasses the tunneling gateway; and communicating the traffic packet to the destination network device through the separate tunnel that bypasses the tunneling gateway; and when the traffic type of the traffic packet comprises multicast traffic:

forwarding the traffic packet to the tunneling gateway for tunneling of the traffic packet by the tunneling gateway.

12. The system according to claim 11, where the circuit is further operable to format the traffic packet for communicating via the separate tunnel that bypasses the tunneling gateway.

13. The system according to claim 11, where the circuit is further operable to establish the separate tunnel via a network connection available to the network device.

14. The system according to claim 11, where the circuit is further operable to:

maintain a tunneling table for use during the offloading when the traffic type of the traffic packet comprises unicast traffic.

15. The system according to claim 11, where the circuit is further operable to:

forward the traffic packet to the tunneling gateway for tunneling of the traffic packet when the traffic type comprises broadcast traffic.

16. The system according to claim 11, where the circuit is further operable to:

forward the traffic packet to the tunneling gateway through a private network.

17. The system according to claim 11, where the circuit is further operable to:

receive, through the separate tunnel that bypasses the tunneling gateway, an encapsulated traffic packet that was encapsulated by the destination network device; and decapsulate the encapsulated traffic packet.

18. The system according to claim 11, where the circuit is further operable to, when the traffic type of the traffic packet comprises unicast traffic:

determine whether addressing information of the destination network device is available; and when the addressing information of the destination network device is not available:

forward the traffic packet to the tunneling gateway for tunneling of the traffic packet by the tunneling gateway; and when the addressing information of the destination network device is not available:

encapsulate the traffic packet using the addressing information; and establish the separate tunnel and communicate the traffic packet to the destination network device.

19. The system according to claim 18, where the circuit is operable to determine whether addressing information of the destination network device is available by:

performing a lookup in a tunneling table.

20. The system according to claim 18, where the circuit that is operable to selectively offload tunneling is in an end-point network device.

* * * * *